Jan. 9, 1940.　　　C. DOERING　　　2,186,100

CLUTCH MECHANISM

Filed Dec. 7, 1937　　　3 Sheets-Sheet 1

INVENTOR.
CHARLES DOERING.
BY
ATTORNEY.

Jan. 9, 1940.　　　　C. DOERING　　　　2,186,100
CLUTCH MECHANISM
Filed Dec. 7, 1937　　　3 Sheets-Sheet 2

INVENTOR.
CHARLES DOERING.
BY
ATTORNEY.

Jan. 9, 1940.   C. DOERING   2,186,100
CLUTCH MECHANISM
Filed Dec. 7, 1937   3 Sheets-Sheet 3
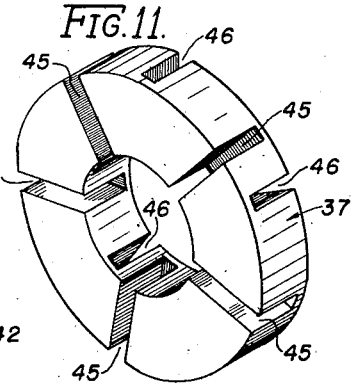
FIG.11.
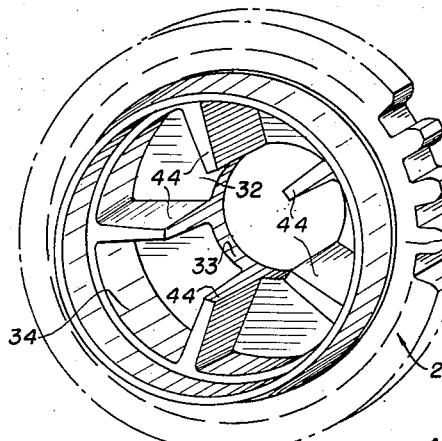
FIG.8.
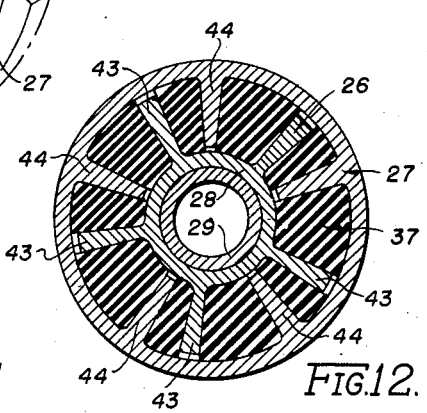
FIG.12.
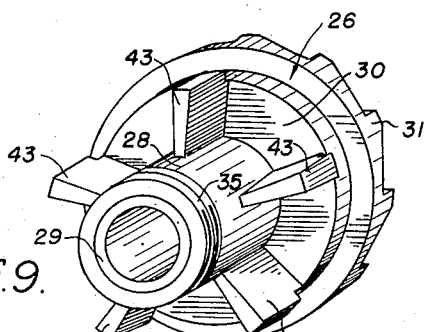
FIG.9.
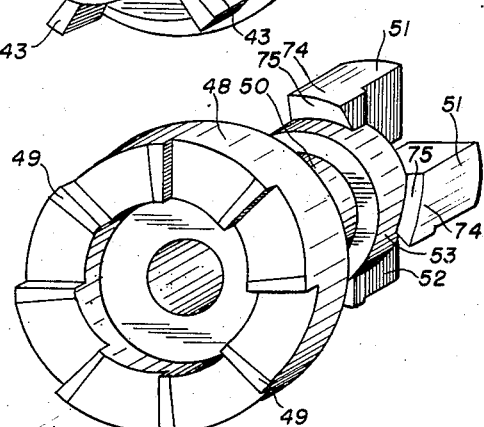
FIG.10.
FIG.13.
INVENTOR.
CHARLES DOERING
BY
ATTORNEY Patented Jan. 9, 1940

2,186,100

UNITED STATES PATENT OFFICE 2,186,100

CLUTCH MECHANISM

Charles Doering, Chicago, Ill.

Application December 7, 1937, Serial No. 178,550

14 Claims. (Cl. 192—55)

This invention relates to coupling members and more particularly to mechanical clutches, although certain features thereof may be employed with equal advantage for other purposes.

It contemplates more especially the provision of an improved mechanical clutch that has shock absorbing qualities to minimize wear and prolong the service life thereof.

One object of the present invention is to simplify the construction and improve the operation of devices of the character mentioned.

Another object is to provide an improved mechanical clutch having shock absorbing expedients to minimize the wear and prolong the service life thereof with negligible maintenance expense.

Still another object is to provide a clutch having a resilient load carrying element to improve the operating characteristics thereof and minimize the wear thereon.

A further object is to provide a clutch driving element with a resilient intermediate member possessing shock absorbing characteristics to prolong the service lift thereof.

A still further object is to provide a resilient torque sustaining clutch element to impart shock absorbing qualities and afford the more effective engagement and disengagement of the complemental parts thereof.

Still a further object is to provide resilient shock absorbing means in conjunction with a clutch to compensate for momentary mis-alignment between inter-engaging parts thereof.

An additional object is to provide a yieldable shock absorbing member in conjunction with a clutch driving element so as to improve the operation and extend the normal service thereof.

Other objects and advantages will appear from the following description of an illustrative embodiment of the present invention.

In the drawings:

Figure 8 is a perspective view of one element of the driving clutch element.

Figure 9 is a perspective view of a complemental member of the clutch driving element, it being a complement of the parts shown in Figure 8.

Figure 10 is a perspective view of the driven element of the clutch element.

Figure 11 is a perspective view of a preformed rubber shock absorbing member interposed between the elements illustrated in Figures 8 and 9.

Figure 12 is a sectional view taken substantially along line XII—XII of Figure 1.

Figure 13 is a sectional view taken substantially along line XIII—XIII of Figure 4.

Figure 1:
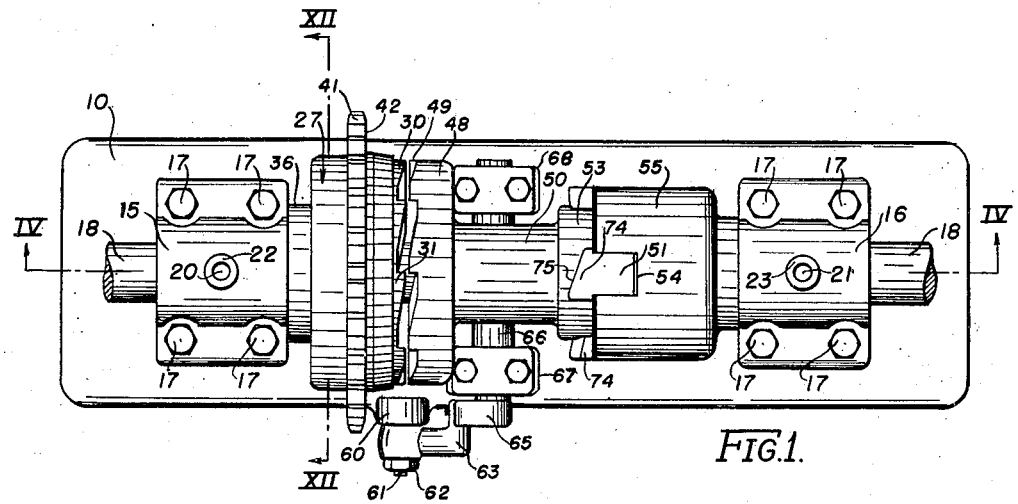
Figure 1 is a plan view of a device embodying features of the present invention, the clutch elements being shown in dis-engaged relation.

The structure selected for illustration comprises any suitable frame member which, in this instance, includes a base 10 having upstanding standards 11 and 12 serving as a support for the lower parts of the sectional bearings 13 and 14 as will appear more fully hereinafter. The sectional bearing members 13 and 14 have complemental top bearing members 15 and 16 serving as a complement thereof and rigidly connected thereto by means of suitable fasteners such as threaded studs 17. A suitably sized driving shaft 18 is journalled in the bearings 13—15 and 14—16, it being connected to suitable moving parts of machinery of any kind or character depending upon the dictates of commercial practice and the purpose for which the clutch or coupling device is to be used.

Suitable lubrication apertures 20 and 21 are provided in the upstanding bosses 22 and 23 formed on the top sectional bearing portions 15 and 16 to facilitate the lubrication thereof. A pair of tubular bushings 24 and 25 are interposed between the sectional bearings 13—15 and 14—16 for journalled support of the shaft 18 in the bearings 13—15 and 14—16. A driving clutch element is provided on the shaft 18, it comprising members 26 and 27 that are associated with each other to comprise a driving element of the clutch as will appear more fully hereinafter.

To this end, the member 26 has a tubular sleeve portion 28 that receives the bearing bushing 29 for journalled support on the shaft 18 to rotate relative thereto. As shown, the tubular sleeve portion 28 of the element 26 terminates in a peripheral flange 30 presenting a series of uniformly spaced gear teeth 31 on the forward face thereof. The element 27 is of cylindrical shape to serve as a complement of the member 26, it being provided with an integrally rearwardly disposed surface plate 32 that has a bore 33 sized to receive the sleeve 28 to define a chambered interior 34 between the forward surface plate 30 and the rear surface plate 32 comprising parts of the complemental clutch elements 26—27.

As shown, the tubular portion 28 of the clutch element 26 is externally threaded as at 35 to receive a correspondingly threaded ring 36 thereon to retain the complemental elements 26-27 in assembled relation with a resilient shock absorbing member 37 disposed therebetween. It is to be noted that the forward surface plate 30 of the clutch element 26 and the cylindrical portion of the element 27 are shaped to enclose a resilient shock absorbing member 37, there being a packing ring 38 and a metallic sealing ring 39 disposed therebetween so as to hermetically seal the shock absorbing member 37 when the flanged retaining ring 36 has been tightened so that its surface packing ring 40 is compressed against the surface plate 32 of the complemental member 27. This effectively and hermetically confines the shock absorbing member 37 so as to preclude the entrance of oil and other foreign substances. The cylindrical complemental clutch member 27 has sprocket teeth 41 formed on the peripheral flange 42 thereof for meshing engagement with a chain or gear to impart rotation to the clutch elements 26—27.

As shown, the clutch element 26 has its tubular sleeve 28 (Figure 9) formed with integral radial outwardly directed webs 43, in this instance five, that extend from the surface plate thereof. Similarly, the complemental clutch member 27 is formed with integrally inwardly extending radial webs 44, in this instance five, which are alternately disposed relative to the webs 43 on the complemental member 26 to confront each other for lodgement in corresponding shaped and sized slots 45 and 46 provided in the shock absorbing member 37 constituting, in this instance, a resilient rubber element molded from rubber that has suitable resilient and torque sustaining characteristics.

It will be apparent, therefore, that the resilient shock absorbing member 37 operatively connects the members 26 and 27 comprising the driving clutch element. The driving clutch elements 26—27 are retained in position on the shaft 18 against the bearings 13—15 by means of a collar 47 which is pressed on the shaft 18 and rests against the forward edge of the bushing 29 and its sleeve 28. The clutch element 48 is provided with surface teeth 49 on the face thereof that confront the correspondingly shaped and complemental teeth 31 on the member 30 to effect positive engagement therebetween. The member 48 has a tubular shank 50 which surrounds the shaft 18 for rotation therewith owing to diametrically disposed lugs 51—52 provided on an enlarged peripheral flange 53 thereof. The diametrically disposed lugs 51—52 are received in correspondingly shaped grooves 54 provided in a cylindrical coupler 55.

The cylindrical coupler 55 surrounds the shaft 18 adjacent the bearings 14—16 for operative connection to the shaft 18. This is effected by means of a key 56 that is lodged between confronting grooves 57 and 58 provided in the coupler 55 and shaft 18, respectively. It will be apparent, therefore, that the coupler 55 together with the clutch element 48 will always be operatively connected for rotation in unison with the shaft 18. In order to effect engagement and disengagement between the clutch elements 30—48 so that the confronting complemental teeth 31-49 will effect a positive connection therebetween, the clutch element 48 is displaceable toward the clutch element 30 to effect complete engagement without completely removing the lugs 51—52 from their correspondingly shaped grooves 54 provided in the coupler 55.

Figure 2:
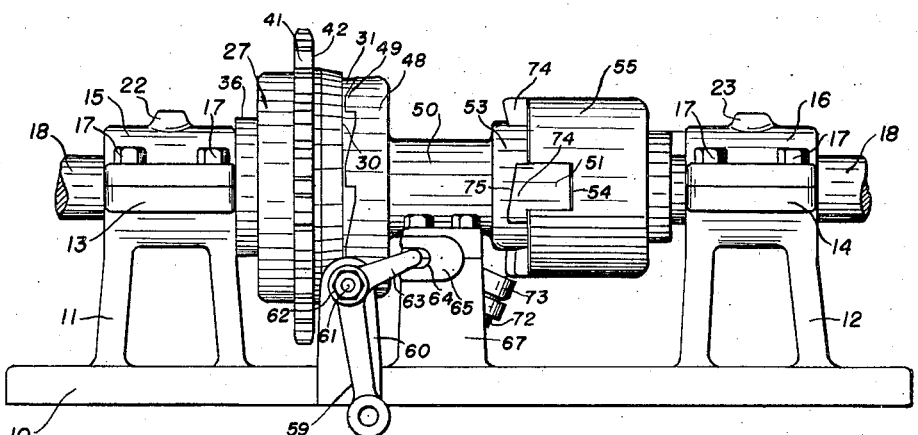
Figure 2 is a front view in elevation of the device shown in Figure 1, the clutch element being shown in engaged relation.

In other words, the throw of the clutch element 48 toward the clutch element 30 to effect complete engagement of the teeth 31—49 is less than the extent of the engagement between the lugs 51—52 and their grooves 54 provided in the coupler 55. Displacement of the clutch element 48 is effected by means of a bell crank lever 59 pivotally mounted on a bracket 60 fixed to the base 10 (Figure 2). A stub shaft 61 extends through the top portion of the upstanding bracket 60 and pivotally carries the bell crank lever 59 for retention thereon by means of a suitable fastener such as a nut 62.

The bell crank lever 59 has its short arm 63 formed integrally therewith and disposed at an angle thereto so that its extremity is lodged in a furcation 64 of the crank arm 65 constituting a part of a rod 66. The rod 66 is journalled transversely of the base 10 in upstanding brackets 67 and 68 so as to horizontally support the rod 66 beneath the shank 50 of the clutch element 48. In order to displace the clutch element 48 relative to the clutch element 30, the actuating rod 66 carries a sleeve 69 that is fixed thereto. The sleeve 69 has an integral ear formed thereon to carry a stud 71 projecting therethrough for rigid attachment by means of a fastener such as a nut 72.

Figure 4:
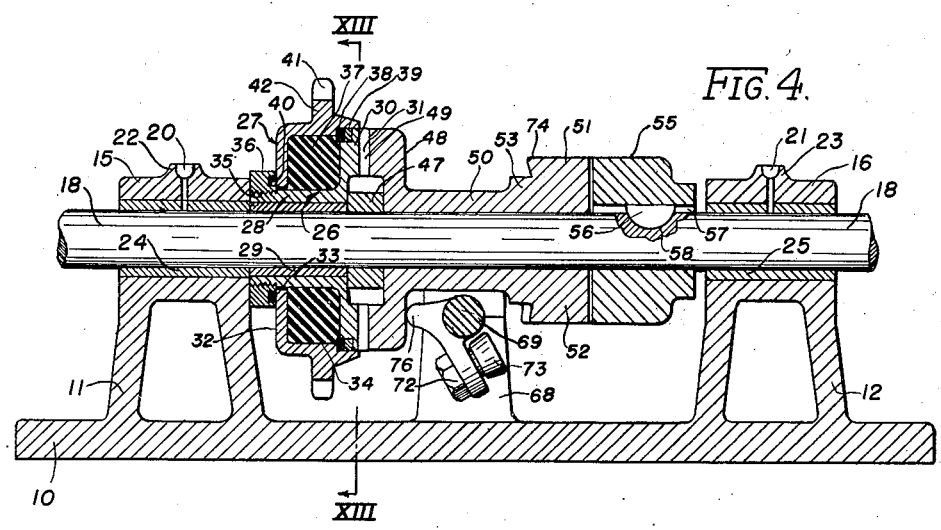
Figure 4 is a sectional view taken substantially along line IV—IV of Figure 1.

The stud 71 carries a cam follower 73 that is displaceable in the path of a plurality of trips 74, in this instance four, radially disposed on the peripheral flange 53 constituting an integral part of the clutch element shank 50. The trips 74 have inclined surfaces 75 that serve to displace the clutch element 48 with its shank 50 and flange 53 when the cam follower 73 is in the path thereof to disengage the teeth 31—49 on the clutch elements 30—48. Then, too, the sleeve 69 of the actuator rod 66 is provided with an integral arm 76 which engages the clutch element flange 48 to effect engagement between the teeth 31—49 when the bell crank lever 59 has been displaced in a counterclockwise direction (viewed from Figure 2) to its extreme position. This elevates the actuator arm 76 for engagement with the clutch element 48 to effect its displacement toward the left (viewed from Figure 4), thereby bringing the teeth 31 and 49 into engagement. Should the teeth 31—49 be momentarily out of alignment and shock is effected in consequence thereof, such will be absorbed and compensated for by the resilient body 37 disposed between the members 26—27 of the clutch element 30. It will be apparent, therefore, that a very silent and effective clutch has been provided that will absorb shock and operate with minimum wear on the coacting elements.

Figure 3:
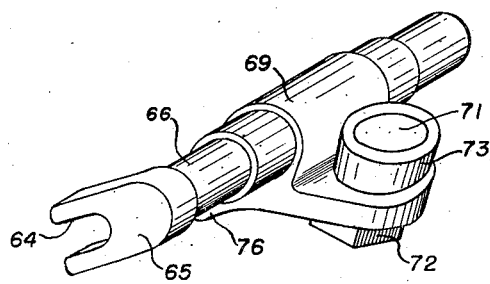
Figure 3 is a perspective view of a clutch actuating member shown in its assembled position in Figures 1 and 2.
Figure 5:
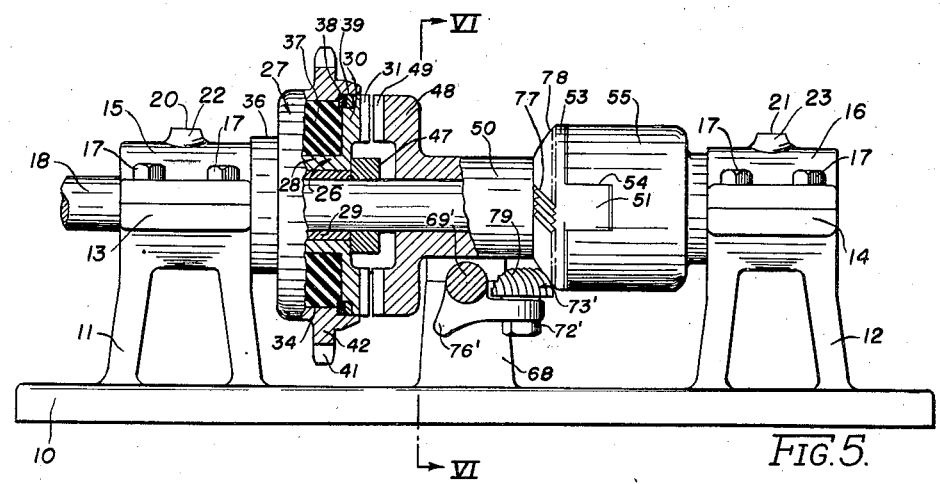
Figure 5 is a fragmentary side view in elevation of a modified form of clutch displacing member, parts thereof being broken away and shown in section to clarify the showing.
Figure 6:
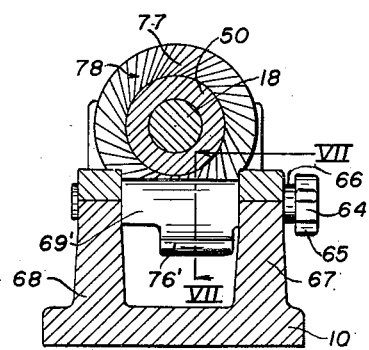
Figure 6 is a sectional view taken substantially along line VI—VI of Figure 5.
Figure 7:
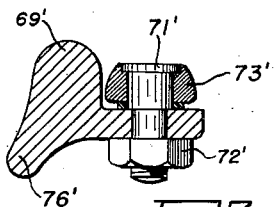
Figure 7 is a sectional view taken substantially along line VII—VII of Figure 6.

In the modified embodiment disclosed in Figures 5 and 6, the clutch elements and their associated parts are identical with the corresponding elements 26, 27, 37, 48 and associated parts of the preferred embodiment described above in detail, the corresponding parts in the modified embodiment being correspondingly numbered to simplify a comparison therebetween without duplicating the detailed description thereof. The only difference is in the displacing member or actuator that will be presently described in detail. In this embodiment, the radial trips 74 with their inclined cam surfaces 75 (Figures 1 and 2) are substituted by inclined flutes or teeth 77 provided in the conical surface 78 that bridges the tubular clutch element shank 50 and its enlarged peripheral terminus flange 53. Instead of the cam follower 73 (Figure 3) utilized in the previous embodiment, a curved button-shaped roll 73' is provided on the stud 71' and is retained in position by a fastener such as a nut 72'.

The external spherical surface of the button-shaped follower roll 73' is provided with curved flutes 79 that mesh with the inclined flutes 77 on the conical surface 78 so as to effect meshing engagement therebetween. The curved flutes 79 are shaped so that when the actuator rod 69' is rotated to effect meshing engagement thereof with the inclined flutes 77, the follower roll 73' will have a tendency of moving toward the clutch element sleeve 50 by virtue of the inclination of the flutes 77, thereby effecting the disengagement of the confronting and complemental teeth 31—49 on the confronting clutch elements 30 and 48. As stated, the tendency of the button-shaped roll with its surved flutes 79 to be drawn toward the clutch elements sleeve 50 in a counterclockwise direction (viewed from Figure 5), effects the displacement of the clutch element 48 toward the right (viewed from Figure 5) so as to effect the disengagement of the clutch teeth 31—49.

To operate the clutch, the crank-arm 76' formed on the sleeve 69' is disposed in the path of the peripheral flange 48 by displacing the bell crank lever 59 so as to effect engagement between the teeth 31—49. Consequently, the operation of the clutch is effected with negligible impact owing to the momentary mis-alignment of the complemental elements, since the inclination of the flutes 77 and the curved flutes 79 will substantially always be in engagement owing to the large number of flutes 77—79 and the curvature of the latter that always insures engagement of some portion thereof with the flutes 77. Then, too, the bell crank lever arm 76' formed on the sleeve 69' can be disposed in the path of the peripheral flange 48 so as to effect engagement between the clutch teeth 31—49.

It will be apparent, therefore, that a very simple, effective and positive clutch has been provided that is silent in operation and compensates for momentary misalignment between the clutch teeth as well as absorbs any impacts resulting from the normal engagement of the complemental clutch elements. To this extent wear is reduced to minimum and in fact is negligible except for rare replacements of the resilient shock absorbing member.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. In a clutch, the combination with a driving element, of a driven element, inter-engaging means disposed between said clutch elements, and a unitary pre-molded resilient load carrying member interposed between said driving and driven element, there being openings pre-molded in said load carrying member to receive said inter-engaging means on said driving and driven elements.

2. In a clutch, the combination with a driving element, of a driven element, inter-engaging means disposed between said clutch elements, and resilient load carrying means consisting of a unitary pre-molded rubber body having openings formed in the lateral faces thereof to receive said inter-engaging means on said driving and driven elements.

3. A clutch element comprising a toothed engaging member, another member associated with said toothed engaging member, and a resilient pre-molded rubber body having alternately disposed openings formed in the opposed lateral surfaces for operatively connecting said members so that rotation of one member will impart corresponding rotation to the other member.

4. A clutch element comprising a toothed engaging member, another member associated with said toothed engaging member, and resilient means consisting of a pre-molded rubber body having slots molded therein to receive said engaging members for operatively connecting said members so that rotation of one member will impart corresponding rotation to the other member.

5. A clutch comprising a driving element, a driven element, means for effecting the engagement and disengagement of said elements, one of said elements comprising a pair of related members, radially disposed webs confronting each other on said related members and a resilient rubber member having radial slots formed therein to receive said webs for operatively connecting said related members together.

6. A clutch comprising a driving element, a driven element, means for effecting the engagement and disengagement of said elements, one of said elements comprising a pair of related members, alternately disposed radial webs on said related members, and a rubber body having slots on lateral surfaces to receive said webs, said rubber member being interposed between said related members for rotation as a unit member.

7. A clutch comprising a driving element, a driven element, means for effecting the engagement and disengagement of said elements, one of said elements comprising a pair of related members having confronting webs, and a circular rubber body having radial slots to receive said webs between said related members for rotation as a unit member.

8. A clutch comprising a driving element, a driven element, inter-engaging toothed means on said elements, means for effecting the engagement and disengagement of said elements, one of said elements comprising a pair of related members having opposed radial confronting webs, disposed alternately of each other and an axially apertured rubber body formed with radial slots to receive said webs, said rubber member being interposed between the said related members for rotation as a unit member.

9. A clutch element comprising a pair of members, alternately disposed webs projecting from said members, and an axially apertured preformed resilient rubber body having radial slots formed on opposed lateral surfaces, said rubber body being interposed between said webbed members to establish a resilient operative connection therebetween.

10. A clutch element comprising a pair of members, one of said members having outwardly extending radial webs, the other of said members having inwardly extending radial webs arranged in alternately disposed spaced relation with each other, and a preformed molded rubber member interposed between said members, said rubber member having radial slots to accommodate the webs of said members for effecting an operative connection between said members.

11. In a clutch, the combination with a driving element, of a driven element, inter-engaging means interposed between said elements, one of said elements being movably mounted relative to the other of said elements and comprising a pair of related members having cooperating means, resilient preformed rubber means between said pair of related members to cushion said cooperating means, one of said elements compensating for momentary misalignment between said inter-engaging means, spaced projections on said movably mounted member, and means shiftable in the path of said projections to disengage said clutch elements.

12. A clutch comprising a shaft, a clutch element journalled on said shaft, another clutch element reciprocally mounted on said shaft for rotation therewith, one of said elements comprising a pair of related members having cooperating means, a preformed molded rubber member between said pair of related members, alternated disposed webs on said related member, there being slots formed in said rubber member to receive said webs for operatively connecting said related members, inter-engaging means on said clutch elements, cam means on said reciprocally mounted clutch element, and a control lever having a cam follower thereon displaceable in the path of said cam means to disengage said clutch elements.

13. A clutch comprising a shaft, a clutch element journalled on said shaft, another clutch element reciprocally mounted on said shaft for rotation therewith, inter-engaging means on said clutch elements, one of said elements comprising a pair of related members having cooperating means, a preformed molded rubber member between said pair of related members, alternated disposed webs on said related member, there being slots formed in said rubber member to receive said webs for operatively connecting said related members, said resilient preformed rubber shock absorbing member between said related members, on one of said elements compensating for momentary misalignment between said inter-engaging means, cam means on said reciprocally mounted clutch element, and a control lever having a cam follower thereon displaceable in the path of said cam means to disengage said clutch elements.

14. A clutch comprising a shaft, a clutch element journalled on said shaft, said element comprising a pair of related members having cooperating means, a preformed molded rubber member between said pair of related members, alternated disposed webs on said related member, there being slots formed in said rubber member to receive said webs for operatively connecting said related members, another clutch element reciprocally mounted on said shaft for rotation therewith, inter-engaging means on said clutch elements, cam means on said reciprocally mounted clutch element, and a control lever having a cam follower thereon displaceable in the path of said cam means to disengage said clutch elements.

CHARLES DOERING.